United States Patent [19]

Prokesch

[11] 3,918,504
[45] Nov. 11, 1975

[54] NONSKID PROTECTIVE DEVICE FOR RESILIENT WHEELS

[75] Inventor: Albin Prokesch, Leonding, Austria

[73] Assignee: Vereinigte Osterreichische Eisen- und Stahlwerke - Alpine Montan Aktiengesellschaft, Austria

[22] Filed: Sept. 20, 1973

[21] Appl. No.: 399,262

[30] Foreign Application Priority Data
Sept. 22, 1972 Austria .............................. 8161/72
June 20, 1973 Austria .............................. 5466/73
June 20, 1973 Austria .............................. 5467/73

[52] U.S. Cl. ............... 152/225; 152/217; 152/233; 152/241
[51] Int. Cl.² .................... B60C 27/02; B60C 27/10
[58] Field of Search .......................... 152/217–219, 152/226–228, 231, 233, 239, 241, 242, 213, 225

[56] References Cited
UNITED STATES PATENTS
2,507,037  5/1950  Miller .............................. 152/233
2,886,091  5/1959  Hines .............................. 152/218
3,031,000  4/1962  Sebena ............................ 152/225
3,079,972  3/1963  Forman ............................ 152/225
3,283,796  11/1966 White et al. ..................... 152/218
3,565,150  2/1971  Carr ............................... 152/218
3,732,910  5/1973  Mathews .......................... 152/225

Primary Examiner—Drayton E. Hoffman
Attorney, Agent, or Firm—Otto John Munz

[57] ABSTRACT

A nonskid device for easy mounting on and dismounting from a resilient tire or wheel respectively, comprising at least two parts wherein one part has clamp shaped portions to surround the tire held in place by outer and inner bars connected to said clamp portions which extend over a small portion of the outside of said tire and elastic connecting means attached to selected points of said bar to provide tight attachment and sufficient slack while said tire is in motion.

4 Claims, 14 Drawing Figures

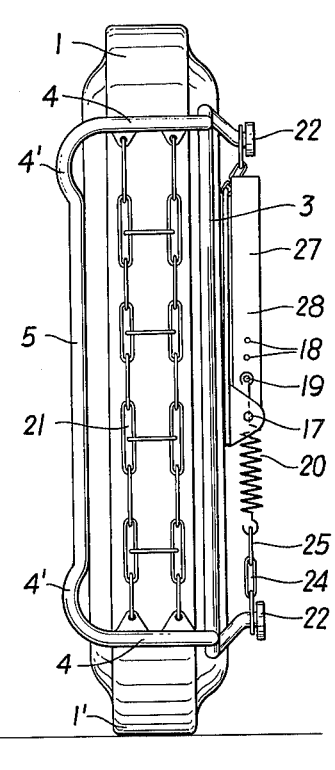
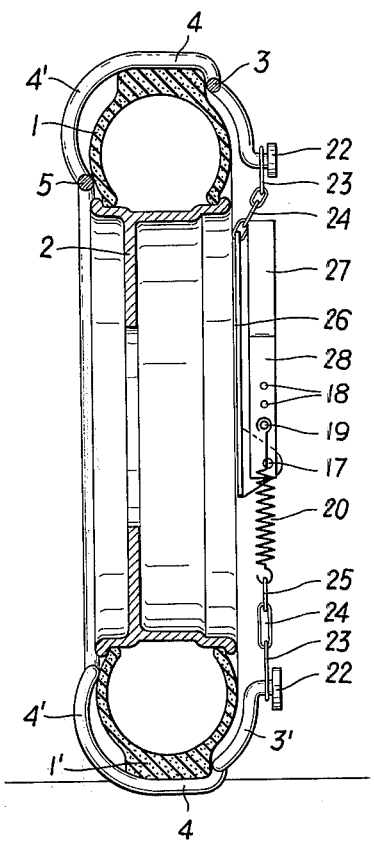

3,918,504

NONSKID PROTECTIVE DEVICE FOR RESILIENT WHEELS

FIELD OF THE DISCLOSURE

A removable nonskid protective device carried circumferentially about resilient tires or wheels equipped with tightening means, flexible cables and chains with traction lugs and flanges.

CROSS REFERENCE TO PRIOR APPLICATIONS

Convention priority of corresponding Austrian applications No. A 8161/72 filed on Sept. 22, 1972, A 5466/73 filed June 20, 1973 and A 5467/73 filed June 20, 1973 is claimed.

DESCRIPTION OF THE PRIOR ART

Two-piece nonskid devices for automobiles are known, in which each piece consists of two clamps, connected through a bar, curved close to the rim on the inside and a straight bar on the outside. The straight bar is partly even closer to the wheel axle than the outer circumference of the rim. Thereby the clamps span the whole tire and give it an insufficient flexibility to accomodate the deformations, which the tire goes through when driven on the road.

SUMMARY OF THE INVENTION

The invention concerns a nonskid protective device for resilient tire wheels, such as of automobiles, especially trucks, and is effective for driving on soft surfaced roads as well as on hard surfaced and snowcovered roads.

An object of the invention is to provide a nonskid protective device, which has at least two parts. Even though there is a tight fit of the device on the tire, the device still has the ability to deform so that only the clamps reach across a portion of the outside of the tire profile, and a bar mounted on the outside of the tire, or on fastening points of the parts, which connect the two pieces of the nonskid device, such as cables, chains, is further away from the axle of the tire i.e. from the rim than the bar on the inside of the tire.

Two opposite points of a cable are connected to an elbow lever lock by a tension spring. In order to provide additional space for the tire in its deformation, those parts of the clamps near the studs on the inside of the wheel close to the rim can be bent away from the tire in order to accomodate its bulge. Suitably the bars leading along the outside of the wheel press against the thickened part of the tire profile.

Another object of the invention is to provide knobs or similar appendages, on the ends of the bars which are running along the outside of the wheel and are bent inwards in order to permit hooking up rings, which by means of chains are attachable to an elbow lever lock.

Another object of the invention is to arrange two adjacent ends of two or three pairs of clamps each with an inner or outer connecting bar or band by elastic parts such as chains, cables or similar onto the ends of a single elbow lever lock.

BRIEF DESCRIPTION OF THE DRAWINGS

FIGS. 5 to 9 inclusive depict another preferred embodiment of the invention.

FIG. 5 is a front view of the wheel from the outside when mounted on a vehicle.

FIG. 6 is a front side view of the surface of the tire of FIG. 5.

FIG. 7 is a view partly in cross-section taken on line VII—VII of FIG. 5.

FIGS. 8 and 9 are views, partly in cross-section of the wheel shown in FIGS. 5 to 7 under a load and unloaded.

In the drawings same reference numerals are used to define same or equivalent parts throughout.

DESCRIPTION OF THE PREFERRED EMBODIMENTS

The embodiment of the invention depicted on FIGS. 1 to 4 comprises a nonskid protective device which consists of two parts made of bent bars and is fastened on tire 1, mounted on rim 2.

Figure 1:
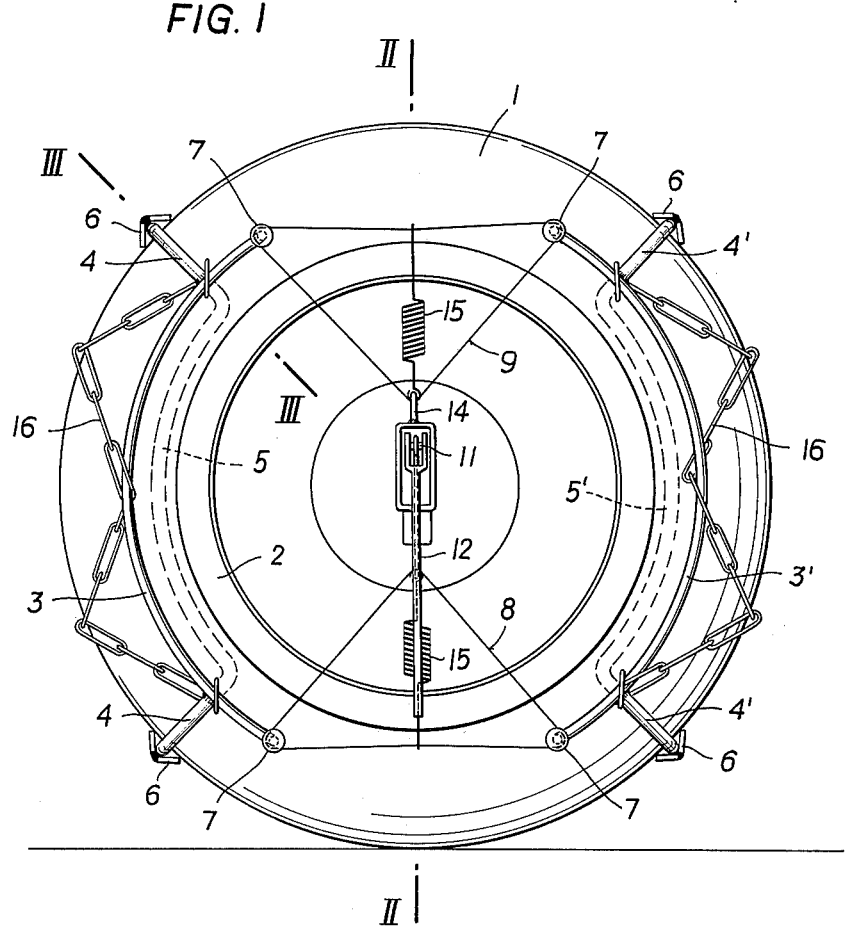
FIG. 1 is a front view of the wheel from the outside when mounted on a vehicle, showing a preferred embodiment of the invention.

Each of the two parts is formed by a curved outer bar 3 and 3' respectively, bent alongside the tire. To the bent bars are welded the ends of a rod which has two clamps 4 and 4', an upper and a lower respectively, an inner bar 5 and 5' is also provided bent alongside the tire. The inner bars are closer to the axle of the wheel than bars 3 and 3'. When the nonskid device is mounted onto the tire as shown in FIG. 1, the lower clamp 4 is positioned diametrically opposite the upper clamp 4', and the upper clamp 4 opposite the lower clamp 4'. Inclined flaps 6 are welded to the clamps 4. On both ends of the bars 3 and 3' are knobs 7, guiding endless cables 8 and 9. The cable 8 is hooked into one end of hook 10, the other end of which is connected with a bolt 11. A clamp type lever 12 is mounted for swivelling around the bolt 11. The lever 12 is provided with holes 13 bearing one end of a swivelling clamp 14. The clamp 14 hooks with its other end into cable 9.

Figure 2:
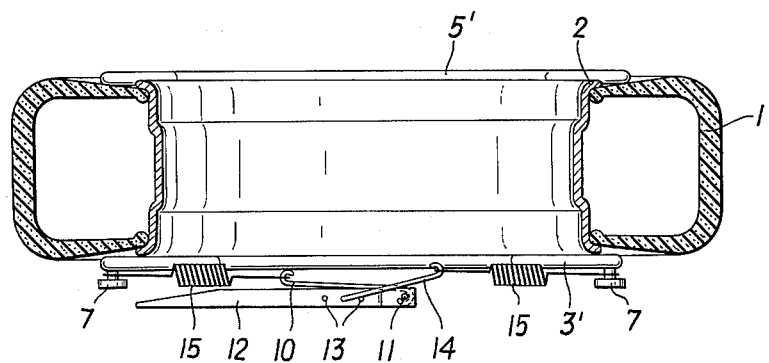
FIG. 2 is a cross-sectional view on lines II—II of FIG. 1.
Figure 3:
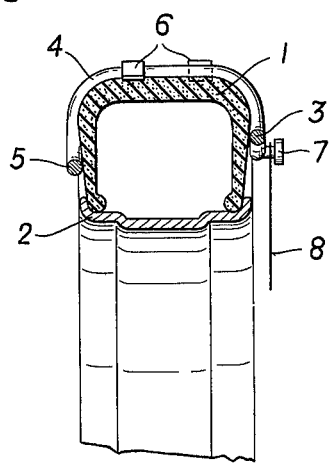
FIG. 3 is a view partly in cross-section taken on lines III—III of FIG. 1.

The centers of the horizontal portions of the cables are connected by a tension spring 15 with those points in which the cables are hooked in hook 10 and clamp 14, as shown on FIG. 2.

Figure 4:
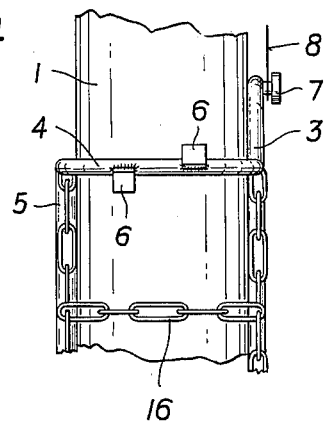
FIG. 4 is a sectional view of the surface of the wheel of FIGS. 1 to 3.

Chains 16 are fastened on the connecting points between the bars 3 and 3' resp., and the clamp 4 and 4' resp., as shown in FIG. 4.

The bars 3 and 3' and 5 and 5' can protrude thereby through the central links of the chains, or the chain links may be guided around the bars. When the cables 8 and 9 are removed both parts 3 to 5 and 3' to 5' may be mounted directly on the tire from left to right, resp.

The parts 10 to 14 represent an elbow lock.

The cables 8 and 9 are hung onto knobs 7, when the lock is open. Thereafter the cable 8 is hooked into the hook 10 and the cable 9 into clamp 14. When the lever 12 is swivelled into the closing position shown on FIG. 1, the two parts 8 and 9 assume the position shown, whereby the springs 15 are stretched. Thereby the horizontal portions of the cables 8 and 9, as shown on FIG. 1, are bent, particularly when the springs are sufficiently strong. The inclined flaps 6 are pressed toward the tire into a fixed position by stretching the elbow lever lock.

It is just as easy to remove the nonskid protective device as it is to put it on.

Figure 8:
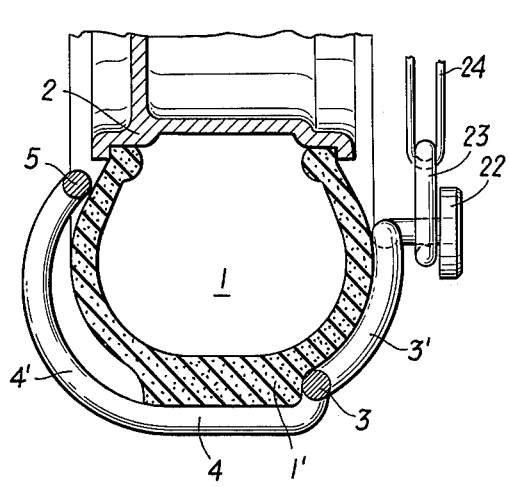
Figure 9:
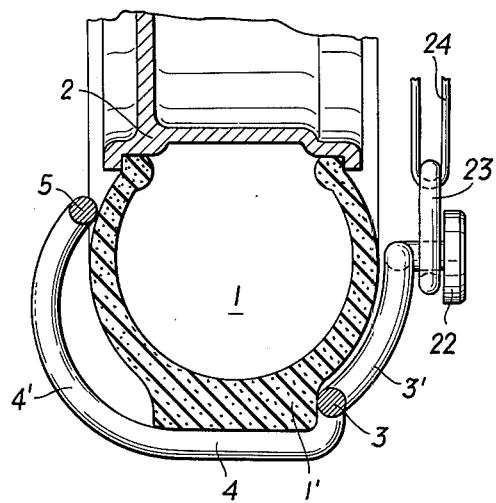

According to a second embodiment of the invention, illustrated on FIGS. 5 to 9, the nonskid device has two parts formed by bent bars which, similarly to the previous embodiment, are formed by an outer circularly bent bar 3. Onto each bar 3 a rod is welded, comprising two clamps 4, bent along the tire and a circular bar bent along the rim. The bar 3 bears on the outer thickened part of the profile of the tire. The clamp 4 thereby bulges on the inside 4' in such a manner that it provides sufficient room for the tire in case of deformation, as shown in FIG. 8.

The ends 3' of bars 3 are bent inwards in the direction of the wheel axis and provided with knobs 22. Into these rings 23 are set, into which in turn fit short chains 24. The chains 24 are connected on one side with plate 26, and on the other side through a ring 23 with spring 20. The lever 28 is provided with a handle 27, swingable along bolts in the bearings of plate 26.

The lever 28 has holes 18 through one of which protrudes a bolt. The inner end of the spring 20 is hooked into bolt 19. In between the clamps 4 the chains 21 can be stretched.

Figure 5:
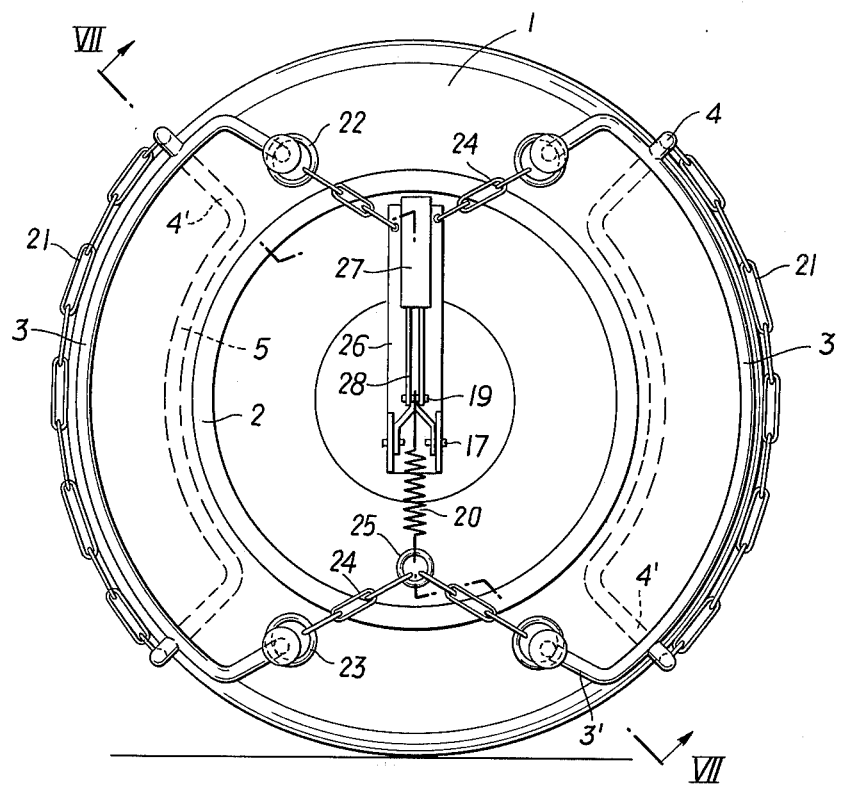

As shown in FIGS. 5 to 7 the elbow lever lock is opened by lowering the lever 27 and in this position the rings 23 can be released from the knobs 22. The spring 20 is released therethrough. Both nonskid devices 3 to 5 can be easily removed from the tire.

The mounting of the nonskid device is accomplished in reverse order. The elbow lever lock is closed by raising the lever 27, while the spring 20 is stretched at the same time.

Instead of providing two parts 3 to 5 to assemble a nonskid device, preferably three such parts may be used on a tire. In the later instances two adjacent knobs 22 can each be connected through a single chain with plate 26. The remaining two adjacent knobs 22 are locked into the spring 20 as described hereinbefore.

Figure 10:
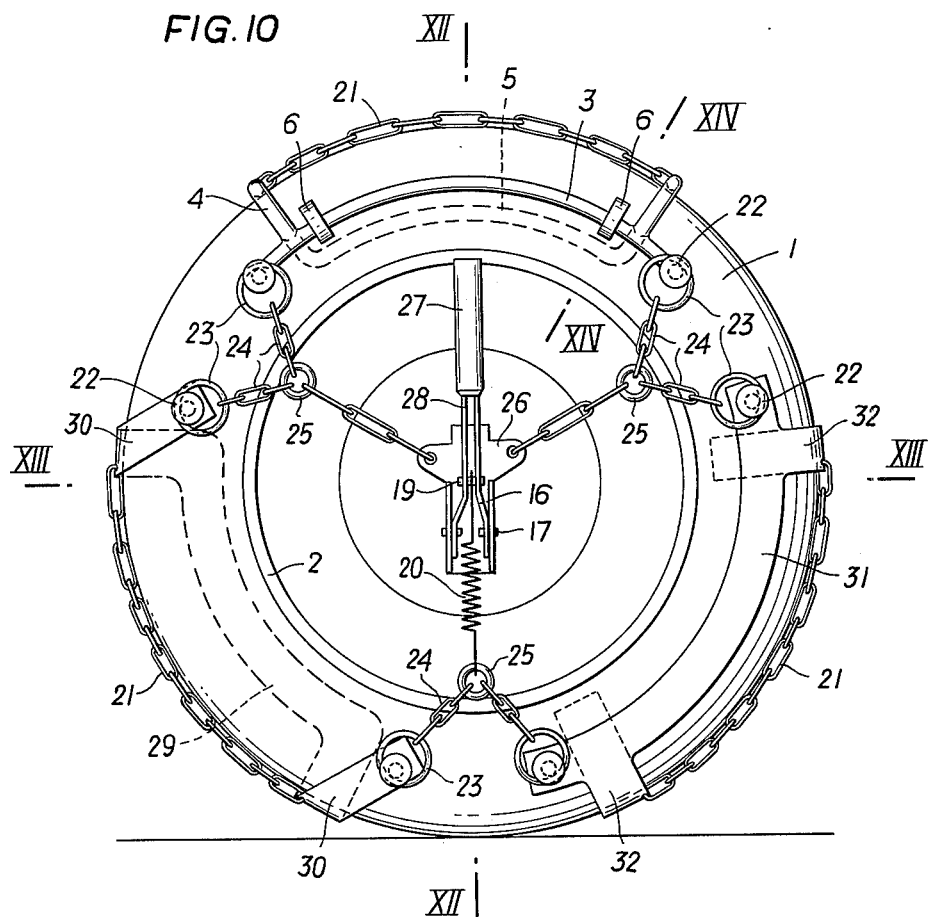
FIG. 10 is a front view of the wheel when mounted on a vehicle, showing three sets of inventive features common to a third, fourth and fifth embodiment of the invention.
Figure 11:
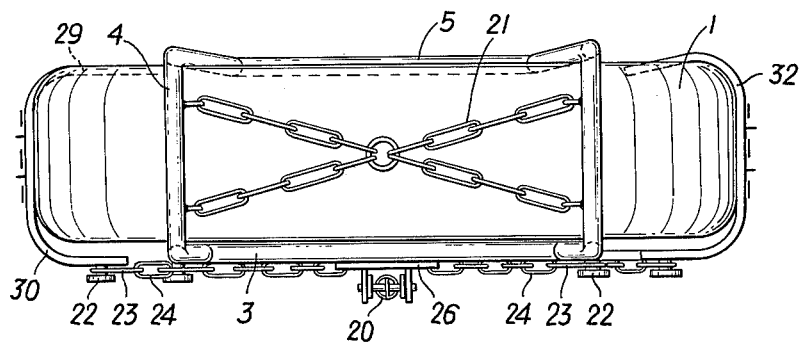
FIG. 11 is a top view of FIG. 10 showing details of the third embodiment of the invention.
Figure 12:
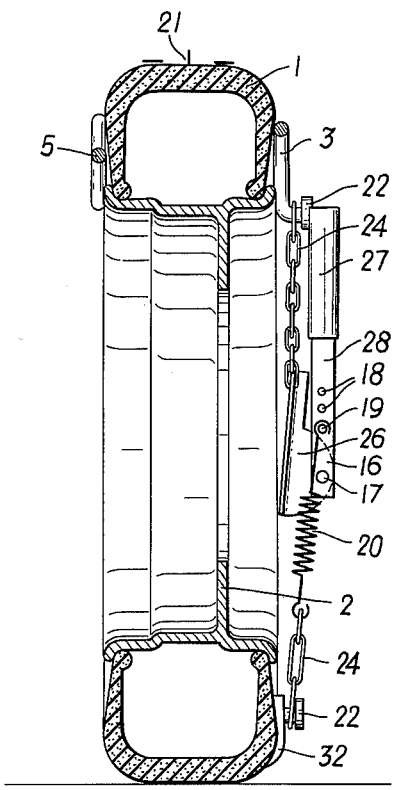
FIG. 12 is a sectional view taken on lines XII—XII of FIG. 10.

FIG. 10 shows nonskid devices according to a third to fifth embodiment of the invention. In a third embodiment of the invention again two outer longitudinal bars are connected through clamps 4 with the two inner bars 5. These bars can be mounted even closer to the tire than shown in the drawings.

The left-hand portion of FIG. 10 shows two inner bars 30, both on the inner side of the tire 1 connected by a connector, such as the band 29. The ends of the bars are bent away from each other in the direction of the periphery and thus the mounting means or knobs 22 at the ends of the bars are bent away from each other a distance greater than the distance of the bars at the outer most periphery of the tire.

The bars are yieldingly connected by a second connector such as a chain 21.

The right-hand portion of FIG. 10 shows two outer bars 32 only on the outer side of the tire 1, connected by a connector, such as the band 31, which has extensions running in the direction of the periphery of the tire, so that the connecting means 22 are farther apart at the end of the band, than the bars at the outermost periphery of the tire.

The bars are yieldingly connected by a second connector, such as a chain 21.

In both above embodiments the connectors 29 and 31 respectively, provide a rigid connection, in contrast to the other embodiments, which have both an outer rod 3 or an outer rod 3', an inner rod 5 or an inner rod 5', respectively.

FIG. 10 shows also the connecting line between the buttons 22 and the inner bar 30, or 32 respectively, runs obliquely through the tire. This diagonal connection exceeds in length the immediate connection of the two legs of a U shaped bar, bent in the direction of the axis of the wheel.

The same principle applies also to those embodiments, which show the inner and outer bars 3 and 5, or 3' and 5' respectively.

The bar 3 or 3' respectively, is further spaced from bar 5 or 5' respectively, than if either of the two sets of bars would be equidistantly spaced from the tire 2.

The device of the invention therefore facilitates the mounting and dismantling of the protective device by the provision of the two bars by permitting its rotation somewhat along its longitudinal axis.

While three embodiments differing in the details are described and are shown on FIG. 10, only one of these embodiments is utilized on one wheel instead.

Figure 14:
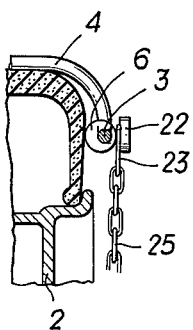
FIG. 14 shows a detail in the section taken on line XIV—XIV of FIG. 10.
Figure 13:
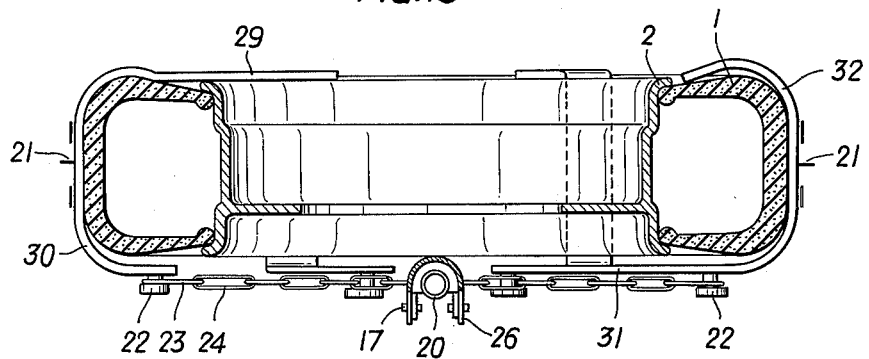
FIG. 13 is a sectional view taken on line XIII—XIII of FIG. 10.

Rotatable eccentric disks 6 are arranged on this bar as shown in FIG. 14. In this manner the friction between the nonskid device and the tire may be controlled.

In accordance with the fourth embodiment of the invention bands 29 are provided which run along the inside of the wheel. The bands end in the clamp 30 which grips the wheel.

In accordance with the fifth embodiment of the invention the bands 31 run along the outside of the wheel. Onto the bands the clamps 32 are attached which grip the wheel. The third through fifth embodiment of the invention has in common that the end of the bars 3 and the bands 31 and clamps 32, resp., are provided with knobs 22, in which hook the rings 23. The rings are connected with rings 25 by short chains 24. Two rings are thereby connected through chains 13 onto a bearing plate 26. A lever 28, having a handle 27 is mounted pivotably by a bolt 17.

The lever 28 is provided with a number of holes 18, through which a screw bolt 19 may protrude as desired. The spring 20 may be hooked into the bolt 19. The other end of the spring is hooked into a third ring 25. The dismantling of the nonskid device occurs in accordance with the position illustrated in FIG. 10 by lowering the levers 27, 28 by which the spring 20 is relieved. Thereafter the rings 23 are easily removed from the knobs 22 and the nonskid device can be dismantled. The mounting of the nonskid device occurs in reverse order by stretching the spring 20, raising the levers 27, 28, whereby the nonskid device is fixedly pressed against the tire.

Instead of three nonskid devices it is possible to use only two, in which case two rings 23 are immediately connected onto the bearing plate 26 through chains, in the same manner as the two other rings 23 are connected onto ring 25 by chain 24, while ring 25 is connected to spring 20.

The third through fifth embodiments of the invention also have in common the possibility for the tires to give way to one side in case of deformation. The employment of the chains 21 stretched between the clamps 4 improves the capability of the vehicle thereby equipped to avoid skid.

What is claimed is:

1. A nonskid protective device for vehicle wheels having rims and elastic tires, said device comprising;
   at least two parts;
   each part having on each of its ends a clamp, shaped to surround the tire;
   an outer and an inner bar connecting said clamp on the inside and the outside walls, respectively, of said tire;
   the bar located on the inside of the tire, when mounted, shaped to run alongside said rim;
   the said clamp extending only over a portion of the outside cross section of said tire;
   elastic members connecting said two parts to surround said tire;
   attaching means on said bars to attach said elastic members to selected points of said bars; the attachment points of said outer bar having a distance from the shaft of said wheel greater than the attachment points of the inner bar;
   the ends of said two parts comprising at least two pairs of clamps each;
   said elastic members having sections extending chordally of the tire between and connecting contiguous ends of said outer bars; and
   an elbow lever tensioning lock extending diametrically across the outer side of the tire between and interconnecting the center points of said chordal sections.

2. A nonskid protective device as claimed in claim 1 further comprising eccentric disks mounted rotatably and means to press them, into the tire on rotation thereof.

3. A non-skid protective device as claimed in claim 1, said outer bars being provided, at least in the direction of the periphery of the rim with extensions, said extensions being bent inwardly in the direction of the axis of the wheel.

4. A non-skid protective device for vehicle wheels, having rims and elastic tires, said device comprising:
   at least two parts;
   each part having on each of its ends a clamp, shaped to surround the tire;
   two inner bars connecting said clamp on the inside walls of said tire;
   the bars when mounted, shaped to run alongside said rim;
   the said clamp extending only over a portion of the outside crossection of said tire;
   elastic members connecting said two parts to surround said tire;
   a connector rigidly connecting said two inner bars;
   the ends of said inner bars bent away from each other in the direction of the periphery of the tire a distance greater than the distance of the bars at the outer-most periphery of the tire;
   a second connector yieldingly connecting the said bars.

* * * * *